Oct. 10, 1950 W. C. ANDERSON ET AL 2,525,281
VEHICLE PLATFORM CONSTRUCTION
Filed Feb. 16, 1948 4 Sheets-Sheet 1

Inventors
Wilbur C. Anderson and
Edmund W. Riemenschneider
By Attorneys

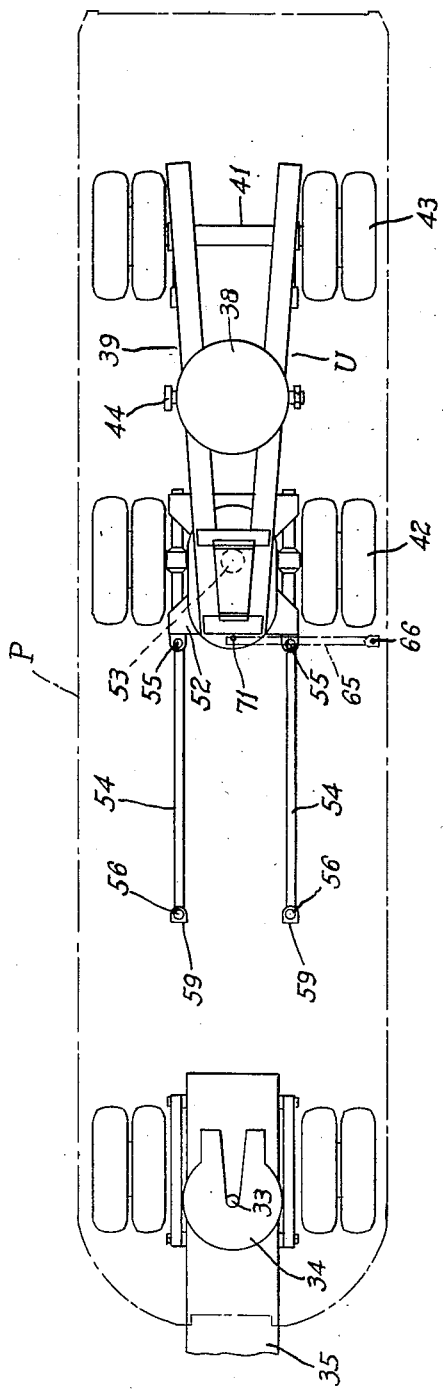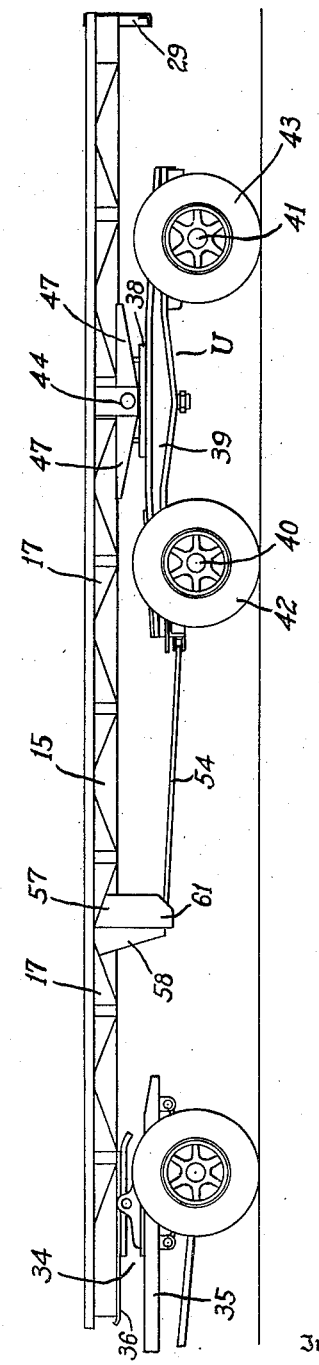

Oct. 10, 1950 W. C. ANDERSON ET AL 2,525,281
VEHICLE PLATFORM CONSTRUCTION
Filed Feb. 16, 1948 4 Sheets-Sheet 3

Inventors
*Wilbur C. Anderson* and
*Edmund W. Riemenschneider*
By *Frease and Bisley* Attorneys Oct. 10, 1950 W. C. ANDERSON ET AL 2,525,281
VEHICLE PLATFORM CONSTRUCTION
Filed Feb. 16, 1948 4 Sheets-Sheet 4

Inventors
Wilbur C. Anderson and
Edmund W. Riemenschneider
By Frean and Bishop Attorneys Patented Oct. 10, 1950

2,525,281

UNITED STATES PATENT OFFICE 2,525,281

VEHICLE PLATFORM CONSTRUCTION

Wilbur C. Anderson and Edmund W. Riemenschneider, Canton, Ohio, assignors to The Union Metal Manufacturing Company, Canton, Ohio, a corporation of Ohio Application February 16, 1948, Serial No. 8,564

10 Claims. (Cl. 280—106)

The invention relates generally to a load-carrying platform or bed for a highway vehicle, and more particularly to a platform construction adapted to be used in trailers of the type shown in U. S. Letters Patent No. 2,373,398, issued April 10, 1945, to Ernest S. Hoobler.

The trailer construction shown in said Hoobler patent includes a load-carrying platform with its front end supported on the fifth wheel of a standard tractor and its rear end provided with a fifth wheel supported on an undercarriage having front and rear axles, the front axle of the undercarriage having a towing connection with the platform and being movable laterally of the platform. Substantial clearance is required below the platform for the undercarriage to swing about its fifth wheel and for the lateral movement of the front axle and its towing connection relative to the platform, because these relative movements of the undercarriage and its front axle occur every time the trailer turns from a straight line path.

Consequently, if the top of the platform is maintained at a standard height, there is a very limited amount of vertical space or clearance under the platform to be occupied by beams or other structural members required for supporting heavy loads, and there is thus insufficient clearance provided for deep flanged beams or trusses such as are usually employed to support large capacity platforms.

Generally speaking, in trailers of this type the clearance under the platform is most limited at the region where the platform is required to have the most strength, because the fifth wheel carrying the trailer platform on the undercarriage is designed to be located at the position of greatest load in order properly to distribute the trailer load for maximum efficiency. Accordingly, if the trailer is properly designed, the least amount of clearance is present between the platform and the undercarriage, and that is where the platform is required to have its greatest strength, which would ordinarily require beams or trusses extending substantial distances below the platform.

It is a general object of the present invention to provide a vehicle platform construction which will have maximum strength with minimum depth and with a minimum amount of weight.

Another object is to provide a novel vehicle platform structure which will efficiently carry all of the main beam loads to which the platform is subjected.

Another object is to provide a novel vehicle platform structure of minimum depth which will efficiently carry eccentric loads to which the platform is subjected, with substantially no eccentric deflection.

A further object is to provide a novel platform construction of minimum depth which will carry torsional loads efficiently, in addition to beam loads and eccentric loads.

A still further object is to provide a novel vehicle platform construction which will resolve all bending and torsional loads into tension or compression loads carried by truss members or equivalent flanges having sufficient capacity to carry the maximum loads for which the vehicle platform is designed.

Finally it is an object of the present invention to provide a novel and improved trailer platform construction having maximum strength for minimum weight, and adapted to be supported on an undercarriage movable relative to the platform, said platform being of standard height and having maximum strength with minimum depth at the region above the undercarriage so as to allow free movement of the undercarriage relative to the platform.

These and other objects are accomplished by the parts, constructions, arrangements and combinations which comprise the present invention, the nature of which is set forth in the following general statement, and a preferred embodiment of which is set forth in the following description and illustrated in the accompanying drawings, and which is particularly and descriptively defined in the appended claims forming part hereof.

In general terms, the vehicle platform construction comprising the present invention may be set forth as including a pair of longitudinally extending laterally spaced beams with a plate connecting their bottom flanges throughout their lengths and forming a box construction for supporting the central portion of the platform, there being transverse stiffening members extending between the beams at longitudinal intervals, a series of vertically tapered outrigger braces extending diagonally outward from the beams at longitudinal intervals and at angles to each other for supporting longitudinal outrigger members at their outer ends, and laterally spaced longitudinal stringers supported on the outrigger braces, beams and transverse stiffeners for supporting planking throughout the top of the platform, there being additional longitudinal stiffener bars located one over each beam throughout the portion of greatest load for increasing the torsional and bending strength of the platform.

Referring to the drawings forming part hereof, in which a preferred embodiment of the invention is shown by way of example:

Fig. 4 is a side elevational view similar to Fig. 2 showing the platform embodied in a trailer, the front end of which has a fifth wheel support on a tractor and the rear end of which has a fifth wheel support on an undercarriage;

Fig. 5 is a top plan view of the trailer undercarriage, showing in dot-dash lines the outline of the trailer platform carried thereby;

Similar numerals refer to similar parts throughout the several views of the drawings.

Figure 1:
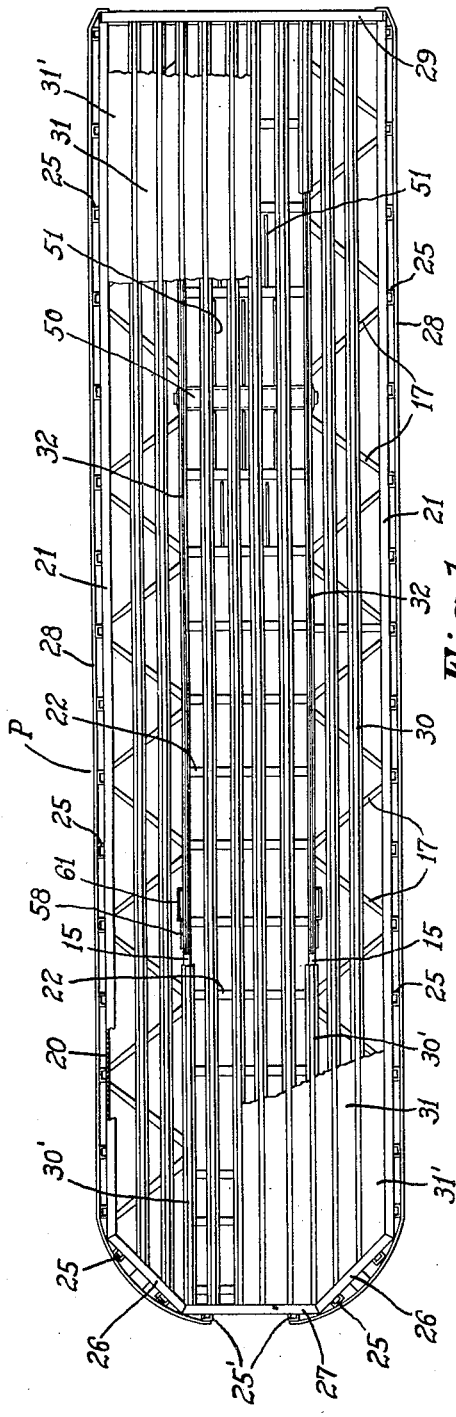
Fig. 1 is a top plan view, with parts broken away and parts in section, of the vehicle platform comprising the present invention.

While the vehicle platform shown in the drawings is a trailer platform having its front end carried on the fifth wheel of a tractor, it will be understood that the platform structure of the present invention can be applied to other vehicles without departing from the scope of the invention. Moreover, while the platform structure is particularly adapted for a trailer having an undercarriage, such as shown in Fig. 4, it will be understood that the novel platform structure can be applied to other trailers, without departing from the scope of the present invention.

As shown in Fig. 1, the trailer platform P is elongated for carrying heavy loads or loads which may be in elongated form, and the length of the platform may be varied considerably within the scope of the present invention. The width may also be varied within narrower limits according to the standard widths of conventional trailer platforms.

Figure 6:
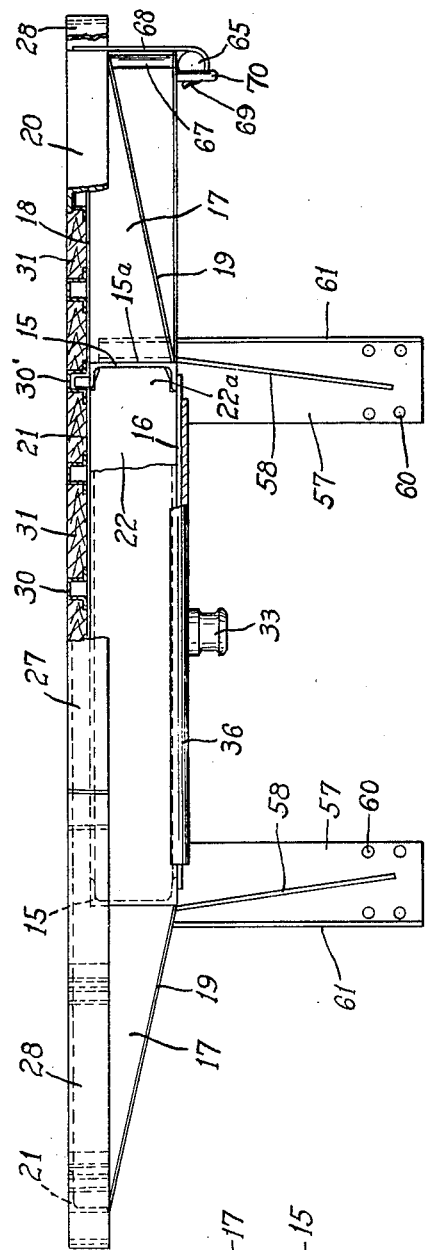
Fig. 6 is an enlarged front end elevation of the novel platform, with parts broken away and in section.

As best shown in Fig. 6, the framework of the novel platform preferably includes two laterally spaced longitudinal channel beams 15 extending the full length of the platform along the sides of longitudinally central portion of the platform. These beams preferably have their legs turned inwardly and are relatively shallow in depth so that a standard height can be maintained for the top of the platform while still allowing ample clearance below the platform for mounting an undercarriage such as indicated generally at U in Fig. 4.

Figure 11:
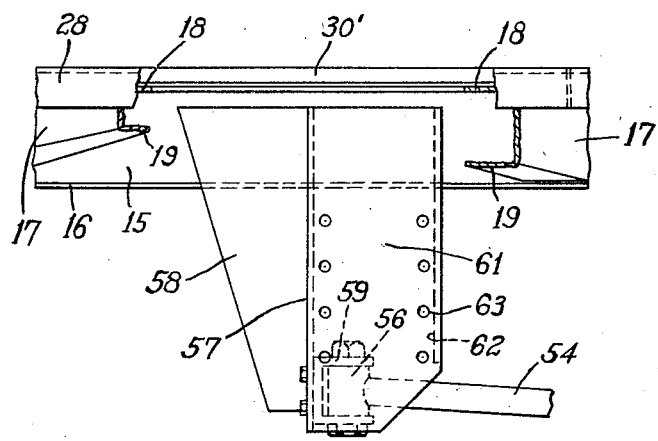
Fig. 11 is an enlarged fragmentary side elevational view of the landing gear and tongue-attaching post construction depending from the front portion of the platform.
Figure 10:
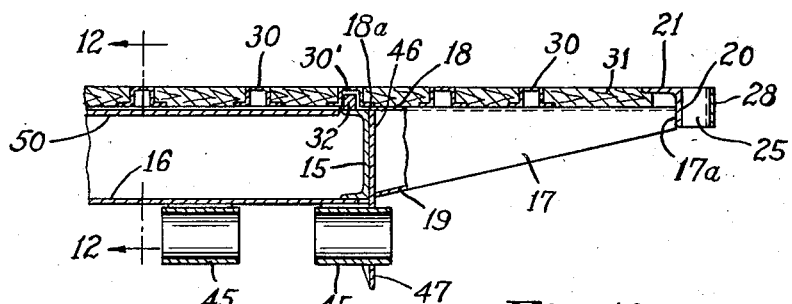
Fig. 10 is a fragmentary sectional view as on line 10—10, Fig. 9.

A relatively heavy plate 16 is secured at its outer edges to the bottom legs of the channels 15 and extends between the channels throughout their entire length, to provide torsional strength for the central portion of the platform which is a hollow box structure of high strength efficiency. This plate may be $\frac{3}{16}''$ thick, for example, and the channels 15 may be 7″–9.8 lbs. per foot standard channels. In order to increase the width of the platform to a standard width, while adding minimum weight, wing portions are provided on each side of the channel beams 15. These wing portions include a series of outrigger braces 17 which extend diagonally outward from the channels alternately in opposite directions, or at angles to each other. The braces 17 are preferably channel shaped in cross section, and as best shown in Figs. 10 and 11 their bottom edges taper vertically upward from a depth equal to the depth of channels 15 at the inner ends of the braces to a very shallow depth at their outer ends.

Figure 9:
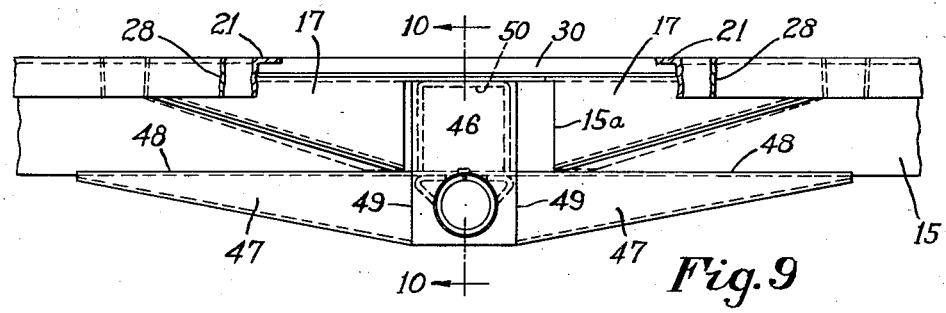
Fig. 9 is a fragmentary side elevational view partly in section of the fifth wheel support on the underside of the rear end of the platform.

Preferably the braces 17 have their top and bottom legs 18 and 19 tapered somewhat in width from their greatest width at inner ends of the braces to their narrowest width at the outer ends thereof. The inner ends of the channel braces 17 are preferably attached to the beams 15 by welding the inner ends of the webs of the braces to the webs of the beams, as at 15a (Fig. 9). The outer ends of the braces are positioned closely adjacent to each other and are bevelled off parallel with the longitudinal beams 15, so as to abut the depending legs 20 of outrigger angles 21 extending longitudinally along the outer edges of the wings. The outer ends of the braces 17 are preferably welded to the legs 20 of the angles 21, as at 17a (Fig. 10).

Figure 3:
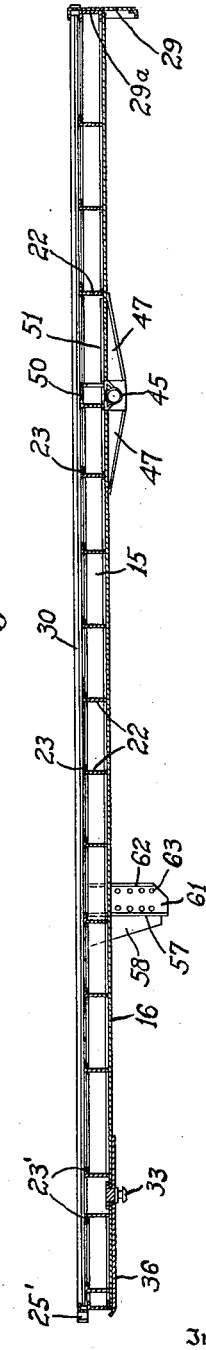
Fig. 3 is a longitudinal sectional view thereof.
Figure 12:
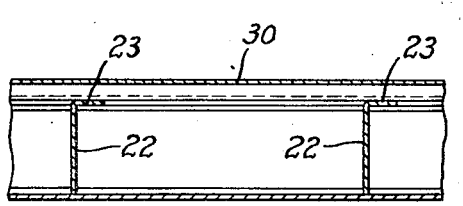
Fig. 12 is an enlarged fragmentary view similar to a portion of Fig. 3.

At longitudinal intervals throughout the length of the platform, stiffening members 22 extend transversely between the webs of the channel beams 15, the ends of the stiffener members having projections 22a (Fig. 6) preferably welded to the channel webs. As shown in Figs. 3 and 12, these stiffener members 22 are L-shaped or angular in cross section, with their top horizontal legs 23 located so that the undersurfaces thereof are in the same plane as the top surfaces of the channel beams 15 and so that their legs 23 are in the same plane as the top legs 18 of the braces 17 in the wings. As shown in Fig. 10, the inner corners 18a of legs 18 slightly overlap the tops of beams 15.

The transverse members 22 tie the beams 15 together at intervals throughout their lengths and provide additional bending strength while also carrying the longitudinal central portion of the floor, and the outrigger braces supply torsional strength to the wings and transfer the bending loads on the wings to the beams. The tapering of the braces 17 horizontally and vertically provides for utmost efficiency, that is, maximum strength with minimum weight in the wings.

At intervals along the outer legs 20 of the outrigger angles, vertically disposed channels 25 are secured by welding their legs to the leg 20, thus forming vertically disposed rectangular openings or pockets for receiving vertical stakes or posts forming side portions of the trailer body. As shown in Fig. 1, the outrigger angles 21 are connected at the front end of the platform to angularly disposed angles 26 which are in turn connected to a transverse front angle 27, and additional stake pocket channels are secured to the angles 26 and 27.

Rubbing plates or rails 28 are secured as by welding to the outer webs of the stake pocket channels 25, and preferably each rubbing plate extends from a stake pocket channel 25' on the front end angle 27 along the adjacent angle 26 and then along the longitudinal outrigger angle 21 connected thereto, said plates 28 being bent over and welded to the ends of the transverse rear or tail plate 29, which plate is supported on a transverse channel 29a at the rear end of the platform.

The floor of the trailer bed or platform is preferably a combination of wood planking and steel stringers extending longitudinally of the platform and carried on the transverse stiffener plates 22 and outrigger braces 17. The stringers are preferably flanged inverted channels 30 of hat shape in cross section welded to the stiffener plates 22 and braces 17 and each stringer is abutted on opposite sides by adjacent longitudinal planks 31, the outer edges of the outer planks 31' being rabbeted under the top legs of the outrigger angles 21.

The stringers 30 are spaced laterally so that one stringer 30' is located over each channel beam 15 and straddles the corners 18a of the legs 18 of braces 17 and the adjacent ends of top flanges 23 of the transverse stiffener angles 22, as best shown in Fig. 6. This combination of stringers and planking adds substantially to the overall torsional strength of the novel bed, and the stringers transfer the bending loads to and through the box structure formed by the beams 15 and plate 16.

Figure 7:
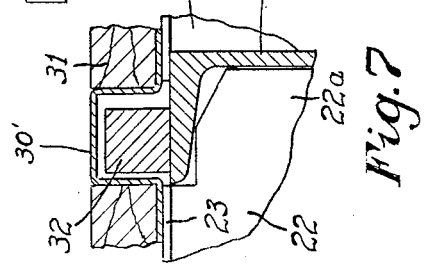
Fig. 7 is a still further enlarged partial cross section showing one of the stiffener bars carried by the longitudinal channel beams.

Additional bending strength with minimum weight is provided in the central section by inserting bars 32 in the stringers 30' and carrying them directly on and securing them to the top legs of channel beams 15, as best shown in cross section in Fig. 7. These bars 32 are preferably of rectangular cross section and extend throughout the greatest load-carrying portions of the beam 15, preferably terminating at points spaced from the front and rear ends of the platform, as indicated in Fig. 1.

A king pin 33 is preferably mounted on the underside of the front portion of the platform midway of its sides for fitting in the usual fifth wheel of a tractor, and as shown in Figs. 4 and 5 the king pin 33 may connect with a fifth wheel 34 of a tractor 35. Preferably, the king pin 33 is supported on the plate 16 between two closely adjacent transverse stiffener bars 23' (Fig. 3), and a heavy skid plate 36 is welded to the underside of said plate 16 for protecting the front portion thereof when the king pin is being connected and disconnected from the fifth wheel 34.

As indicated in Figs. 4 and 5, the rear end portion of the trailer bed may be supported on the fifth wheel plate 38 of an undercarriage U such as is described and claimed in our copending application, Serial No. 611,364, filed August 18, 1945, and entitled Trailer Vehicle Construction, issued as Patent No. 2,466,194 on April 5, 1949. The fifth wheel plate 38 is carried on an intermediate portion of an A frame indicated generally at 39 and carried by front and rear axles 40 and 41 supported on wheels 42 and 43 respectively. Thus the A frame 39 can swing about the fifth wheel 38 relative to the trailer bed or platform.

Figure 8:
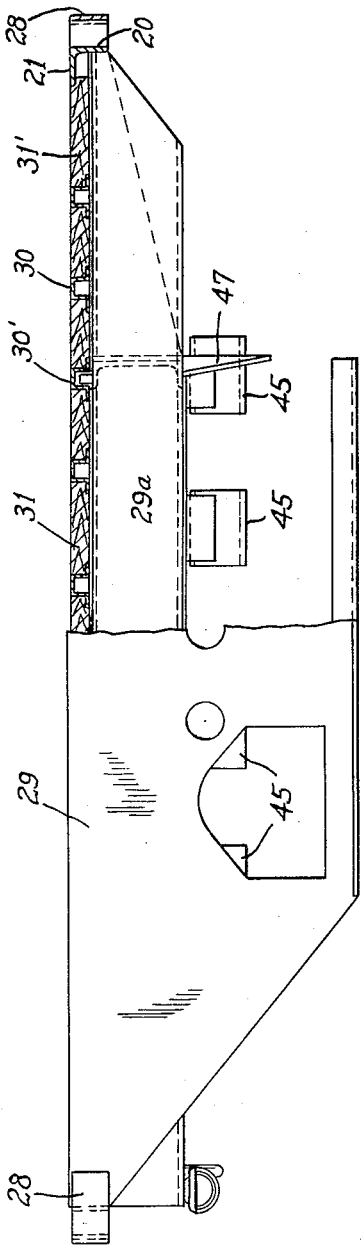
Fig. 8 is an enlarged rear end elevation of the novel platform, with parts broken away and in section.

The trunnion bolt 44 of the fifth wheel is preferably journaled in laterally spaced bearings 45 carried on the underside of the platform. As best shown in Figs. 8, 9 and 10, the outer bearings 45 are carried directly under the beams 15 by vertical plates 46 engirdling the bearings at their lower ends and having their upper ends abutting the webs of the channel beams and welded thereto. Longitudinal gusset plates 47 are provided for bracing the bottom end of each bearing plate 46, and as shown in Fig. 9, the gusset plates have flanged upwardly tapered bottom edges, the upper horizontal edges 48 of the plates being welded to the bottom edge of the channel beam 15, and the inner ends 49 of the plates abutting and being welded to the lower end of bearing plate 46.

Immediately above the bearings 45 is an inverted U-shaped beam 50 extending transversely between the longitudinal beams 15 for imparting additional bending strength to carry the loads transferred to and from the platform at that point through the trunnion bolt 44. As indicated in Figs. 1 and 3, a number of longitudinal stiffener bars 51 may be welded to the upper side of plate 16 at laterally spaced intervals on opposite sides of transverse beam 50, where plate 16 is in higher compression stress to keep it from buckling.

Referring to Figs. 4 and 5, the front axle 40 of the undercarriage U is preferably carried on a dolly frame 52 which is movably connected to the A frame 39 by means of a pivot indicated in dotted lines at 53. Means for maintaining the axle 40 perpendicular to the longitudinal centerline of the platform as the A frame 39 swings about the fifth wheel 38, preferably includes a pair of parallel tongues 54 connected at their rear ends by means of substantially universal connections 55 on the dolly 52.

The front ends of the tongues 54 have substantially universal connections 56 with depending laterally disposed plates 57 supported at their upper ends on the longitudinal beams 15, and the plates 57 preferably have gusset braces 58 welded thereto and extending forwardly therefrom, the upper ends of braces 58 being welded to the webs 15a of beams 15. The universal connections 56 for the front ends of the tongues are attached to brackets 59 secured to the plates 57 by means of bolts passing through the four holes 60 shown in Fig. 6.

Landing gear plates 61 depend from the beams 15 at or adjacent to the plates 57 and as shown, the plates 61 may be longitudinally disposed and have their front edges welded to the outer edges of the plates 57, the rear edges of plates 61 each having an inturned flange or rib 62 the upper portion of which is welded to the web of the beam 15 immediately above the plate. The plates 61 each have a double row of vertically spaced holes 63 for attaching landing gear such as jacks or dollies for supporting the front end of the trailer bed when it is disconnected from the tractor.

Figure 2:
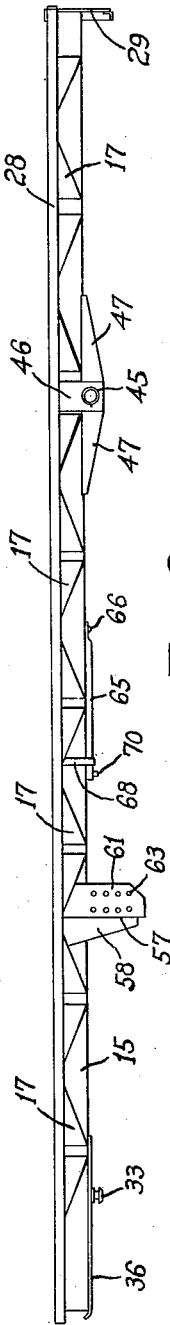
Fig. 2 is a side elevation thereof.

Referring to Figs. 1, 2 and 6, a backing bar 65 is pivotally mounted at one end on the bottom of one side of the platform. Preferably, the bar 65 has a pivotal connection 66 with the outer end of a laterally extending channel support bar 67 secured at its inner end to the adjacent beam 15 and at its outer end to the outrigger angle 21. A strap 68 depends from the angle 21 and has a hook 69 on its lower end normally carrying the free end of the backing bar 65.

When it is desired to hold the undercarriage from lateral movement while backing the vehicle, the bar 65 is released from hook 69 and swung inwardly, whereupon the pin 70 on the end of the bar is inserted in a hole 71 in the front of the undercarriage, as indicated in Fig. 5, thus locking it against movement relative to the platform.

As previously stated the longitudinal rectangular bars 32 extend along the tops of beams 15 only throughout their greatest load-carrying portions of said beams. Referring to Fig. 1, the front ends of the bars 32 are at the front of the gussets 58 of the tongue-attaching plates 57, and the rear ends of the bars 32 terminates substantially half way between the rear end of the platform and the trunnion beam 50.

The hollow box structure formed by the longitudinal beams 15, the bottom plate 16 and the stringers 30 provides a shallow bed of highest efficiency, having very high bending and torsional strength with minimum weight. The tapered diagonal outrigger braces supporting the stringers and planking provide lateral wings or extensions to the platform having high torsional strength and efficiently transferring bending loads to the central box structure. The longitudinal bars 32 add bending strength to the box structure in the area where the greatest strength is needed without adding excessive weight, and the bars 32, together with the stringers 30 over the central section, eliminate the need of any plate connecting the top flanges of the beams 15.

Accordingly, the hollow box construction forming the central portion of the novel bed provides a complete system for efficiently handling bending loads, torsional loads and eccentric loads. It has been proved in actual practice that the structure has unusual and unexpected strength in resisting eccentric loads without substantially any eccentric deflection.

Due to the novel and efficient design of the bed, all bending and torsional loads are resolved into tension and compression forces acting on truss members or flange equivalents of truss members, and when the structure is subjected to loads reversing in direction, there is a minimum amount of reversing forces taking place in the various members designed to take the tension and compression forces. Accordingly, the novel and improved structure has maximum strength for minimum weight and with a minimum depth, so as to provide a strong and efficient platform construction giving maximum clearance under the platform while maintaining it at a standard height.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

We claim:

1. Vehicle platform construction of maximum strength with minimum weight and depth, including a pair of laterally spaced longitudinally extending beams, a horizontal plate connecting the bottom edges of said beams throughout their lengths, stiffener members extending between said beams at longitudinal intervals, longitudinally extending planks supported on said stiffener members, said beams, horizontal plate and planks forming a box construction comprising the longitudinally extending central potrion of said platform, diagonal outrigger braces extending outwardly at intervals from said beams, and additional longitudinally extending planks supported on said braces, said braces and planks forming platform wings providing lateral extensions to said central platform portion.

2. Vehicle platform construction of maximum strength with minimum weight and depth, including a pair of laterally spaced longitudinally extending beams, a horizontal plate connecting the bottom edges of said beams throughout their lengths, stiffener members extending between said beams at longitudinal intervals, longitudinally extending stringer members supported on said stiffener members, longitudinally extending planks extending between said stringers, said beams, stringers and horizontal plate forming a box construction comprising the longitudinally extending central portion of said platform, diagonal outrigger braces extending outwardly at intervals from said beams, additional longitudinally extending stringers supported on said braces, additional longitudinally extending planks between said stringers, said braces and stringers forming platform wings providing lateral extensions to said central platform portion.

3. Vehicle platform construction of maximum strength with minimum weight and depth, including a pair of laterally spaced longitudinally extending beams, a horizontal plate connecting the bottom edges of said beams throughout their lengths, stiffener members extending between said beams at longitudinal intervals, diagonal outrigger braces extending outwardly at intervals from said beams, longitudinal outrigger members connecting the outer ends of said braces, and floor members supported on said stiffener members and braces, said beams, bottom plate and braces forming a box construction with laterally extending wings.

4. Vehicle platform construction of maximum strength with minimum weight and depth including a pair of laterally spaced longitudinally extending beams, a horizontal plate connecting the bottom edges of said beams throughout their lengths, stiffener members extending between said beams at longitudinal intervals, diagonal outrigger braces extending outwardly at longitudinal intervals from said beams, said braces being tapered vertically from their greatest depth at the beams, longitudinal outrigger members connecting the outer ends of said braces, and floor members supported on said stiffener members and braces, said beams, bottom plate and braces forming a box construction with laterally extending wings.

5. Vehicle platform construction of maximum strength with minimum weight and depth including a pair of laterally spaced longitudinally extending beams, a horizontal plate secured to and connecting the bottom edges of said beams throughout their lengths, stiffener members on said plate and extending between said beams, diagonal outrigger braces extending outwardly at longitudinal intervals from said beams, longitudinal outrigger members connecting the outer ends of said braces, and longitudinal stringer bars supported at lateral intervals on said braces and stiffener members for supporting a floor, said beams, bottom plate, stringers and braces forming a central box construction with laterally extending wings.

6. Vehicle platform construction of maximum strength with minimum weight and depth, including a pair of laterally spaced longitudinally extending beams, a horizontal plate secured to and connecting the bottom edges of said beams throughout their lengths, transverse stiffener members on said plate and extending between said beams, diagonal outrigger braces extending outwardly at longitudinal intervals from said beams, said braces being tapered vertically to become gradually reduced outwardly from their greatest depth at the beams, longitudinal outrigger members connecting the outer ends of said braces, longitudinal stringer bars supported at lateral intervals on said braces and stiffener members, and planks between and supported by said stringer bars, said beams, bottom plate, stringers and braces forming a central box construction with laterally extending wings.

7. Vehicle platform construction of maximum strength with minimum weight and depth, including a pair of laterally spaced longitudinally extending beams, a horizontal plate connecting the bottom edges of said beams throughout their lengths, stiffener members extending between said beams at longitudinal intervals, diagonal outrigger braces extending outwardly at intervals from said beams, longitudinal outrigger members connecting the outer ends of said braces and floor members supported on said stiffener members and braces, said beams, bottom plate and braces forming a box construction with laterally extending wings, and a longitudinal reinforcing bar carried on the top of each beam.

8. Vehicle platform construction of maximum strength with minimum weight and depth, including a pair of laterally spaced longitudinally extending beams, a horizontal plate secured to and connecting the bottom edges of said beams throughout their lengths, stiffener members on said plate and extending between said beams, diagonal outrigger braces extending outwardly at longitudinal intervals from said beams, longitudinal outrigger members connecting the outer ends of said braces, and longitudinal stringer bars supported at lateral intervals on said braces and stiffener members for supporting a floor, said beams, bottom plate, stringers and braces forming a central box construction with laterally extending wings, and a longitudinal reinforcing bar carried on the top of each beam.

9. Vehicle platform construction of maximum strength with minimum weight and depth, including a pair of laterally spaced longitudinally extending beams, a horizontal plate secured to and connecting the bottom edges of said beams throughout their lengths, stiffener members on said plate and extending between said beams, diagonal outrigger braces extending outwardly at longitudinal intervals from said beams, longitudinal outrigger members connecting the outer ends of said braces, hollow longitudinal stringer bars supported at lateral intervals on said braces and stiffener members, each of said beams having one of said stringer bars on top thereof, and a longitudinal reinforcing bar positioned in each of said two stringer bars carried on said beams, said beams, bottom plate, stringer bars and braces forming a central box construction with laterally extending wings.

10. Vehicle platform construction of maximum strength with minimum weight and depth including a pair of laterally spaced longitudinally extending beams, a horizontal plate secured to and connecting the bottom edges of said beams throughout their lengths, transverse stiffener members on said plate and extending between said beams, diagonal outrigger braces extending outwardly in oppositely angled directions at longitudinal intervals from said beams, said braces having their lower edges tapered outwardly and their upper edges horizontal, hollow longitudinal stringer bars supported at lateral intervals on said braces and stiffener members, each of said beams carrying one of said stringer bars on the top thereof, and a longitudinal reinforcing bar positioned in each of said two stringer bars carried on said beams.

WILBUR C. ANDERSON.
EDMUND W. RIEMENSCHNEIDER.

REFERENCES CITED

The following references are of record in the file of this patent:

UNITED STATES PATENTS

| Number | Name | Date |
| --- | --- | --- |
| 2,222,335 | Dietrich | Nov. 19, 1940 |
| 2,256,037 | Reid | Sept. 16, 1941 |

FOREIGN PATENTS

| Number | Country | Date |
| --- | --- | --- |
| 313,324 | Italy | Dec. 22, 1933 |